DECOMPRESSION CONTROL FOR INTERNAL COMBUSTION ENGINE
Original Filed July 19, 1967
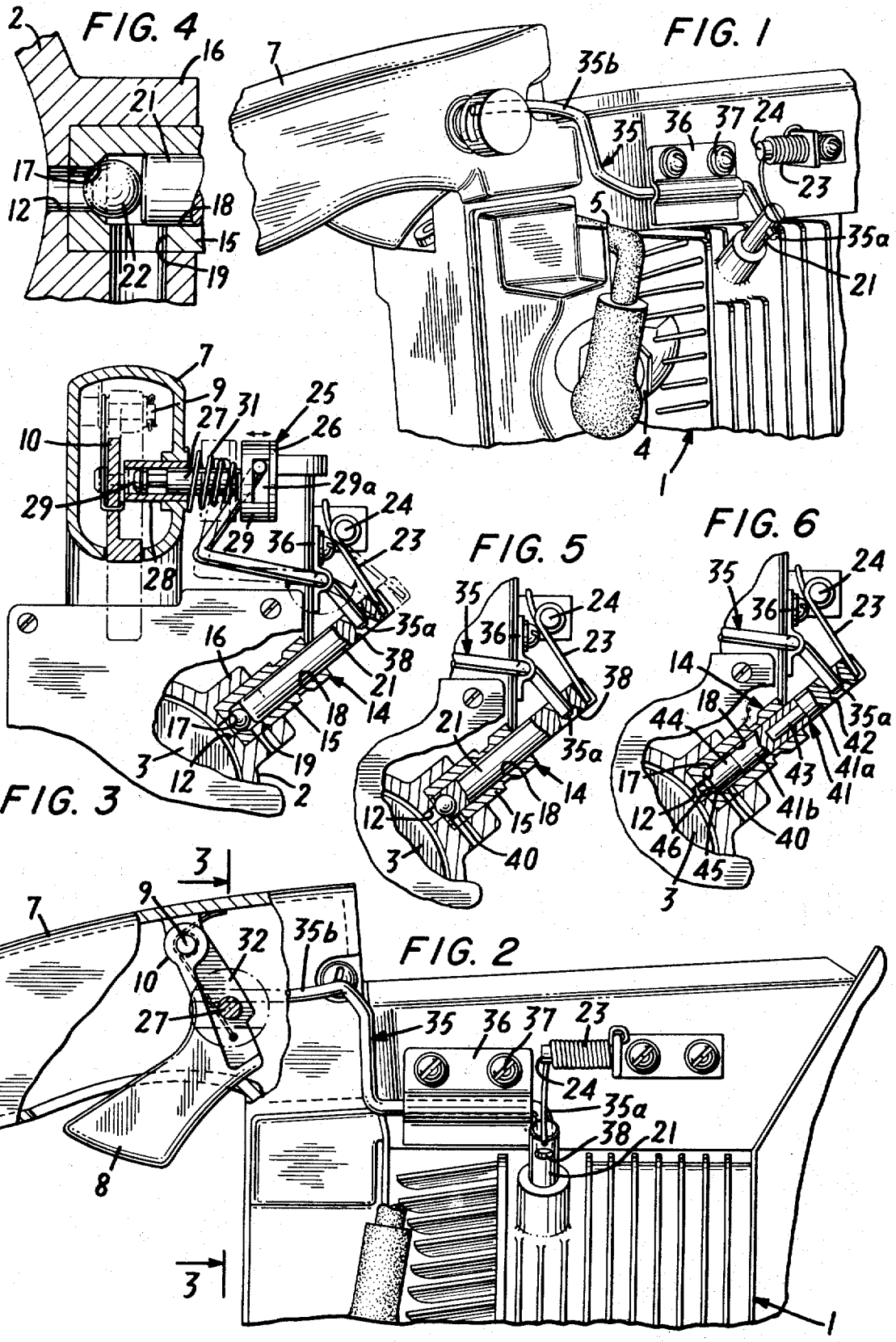

United States Patent Office

Re. 27,410
Reissued June 27, 1972

27,410
DECOMPRESSION CONTROL FOR INTERNAL COMBUSTION ENGINE

Albert E. Anderson, Greenwich, Albert K. Newman, Noroton, Chris Schou, Greenwich, and James A. Ransom, Bryam, Conn., and Walter Gorski, Armonk, N.Y., assignors to Textron Inc.

Original No. 3,418,992, dated Dec. 31, 1968, Ser. No. 654,446, July 19, 1967. Application for reissue Dec. 23, 1970, Ser. No. 100,963
Int. Cl. F01l *13/08*
U.S. Cl. 123—182 12 Claims

Matter enclosed in heavy brackets [ ] appears in the original patent but forms no part of this reissue specification; matter printed in italics indicates the additions made by reissue.

ABSTRACT OF THE DISCLOSURE

To facilitate starting, an internal combustion engine is provided with a decompression port located at a selected distance from the top of the cylinder so as to decrease compression during cranking of the engine. The port is controlled by a valve which is normally closed and which preferably comprises a ball shaped valve member pressed against an annular valve seat. A unitary locking element holds the engine throttle control member in selected position for starting and also holds the decompression valve open. As soon as the engine starts, actuation of the throttle control member releases the locking element and thereby results in the automatic closing of the decompression valve.

The present invention relates to internal combustion engines and particularly to means for facilitating the starting of such engines. The invention is particularly applicable to small 2-cycle engines of the kind used for chain saws and other portable tools, lawn mowers, outboard motors, etc.

In order to increase the horsepower rating and efficiency of small internal combustion engines while keeping the weight of the engines at a minimum, it is desirable to operate the engines at a high compression ratio. The resistance offered by this high compression makes it difficult to turn the engines over during cranking.

In order to facilitate the starting of internal combustion engines, it has heretofore been proposed to provide means for relieving, at least in part, the compression in the engine cylinder during cranking. Compression is relieved by means of a port in the engine cylinder permitting the exhaust of gases from the cylinder during at least a part of the compression stroke. The decompression port must, of course, be closed during normal operation of the engine as it would otherwise result in an objectionable loss of power and efficiency. Accordingly, the port is provided with valve means which is opened during cranking of the engine and must be closed after the engine has started.

While a decompression valve makes it easier to crank an internal combustion engine, it is disadvantageous in that it requires the operator to actuate an additional control device. This is particularly objectionable in hand-held power tools such as chain saws. The operator is required to hold the tool with one hand—preferably resting it on a supporting surface—while pulling the starter cable with the other hand. The addition of an extra control requiring the operator's attention complicates the starting procedure.

It is an object of the present invention to provide a unitary control system by which a decompression valve is automatically held in an open position during cranking of the engine and is automatically closed when the engine has started. The operator performs only those functions which he customarily performs in starting the engine. No additional action is required of the operator to effect a reduction in compression during cranking of the engine and re-establishing full compression after the engine has started.

When the engine is running, it is important to maintain the decompression valve tightly closed in order to avoid leakage of gases either during the compression stroke or the firing stroke of the engine. It has been found that with decompression valves of former design, it is difficult consistently to avoid leakage. It is accordingly a further feature of the invention to provide an improved decompression valve which is of simple construction, yet is highly effective in maintaining a fluid tight seal despite the high pressures to which the valve is subjected during operation of the engine.

The invention is applicable to engines provided with hand starting, e.g., by means of the usual pull cord. With hand starting, the decompression system in accordance with the invention materially reduces the effort required for cranking the engine. The invention is also advantageous when applied to engines provided with self starters in that the reduced effort required for cranking the engine makes it possible to use smaller, lighter and less expensive starters.

The invention will be more fully understood from the following description of preferred embodiments illustrated by way of example in the accompanying drawings in which:

FIG. 1 is a fragmentary perspective view illustrating application of the invention to an internal combustion engine, FIG. 2 is a side view with portions broken away to show internal construction, FIG. 3 is a view taken partly in section approximately on the line 3—3 in FIG. 2 with portions broken away to show the construction of the decompression valve, FIG. 4 is an enlargement of a portion of FIG. 3, and FIGS. 5 and 6 are views corresponding to a portion of FIG. 3 but showing different valve constructions.

In the drawings, there is shown a portion of an internal combustion engine 1 which, by way of example, may be a single cylinder, 2-cycle engine. The engine 1 is illustrated as having a cylinder 2 in which a piston 3 is reciprocable. A spark plug 4 provided in the cylinder head is connected by an insulated wire 5 to a magneto or other source of electricity.

The engine 1 is shown providing with a hollow grip or handle portion 7 with which is associated a member 8 for controlling the speed of the engine, e.g., by regulating the supply of fuel to the engine cylinder. The engine control member 8 is shown in the form of a trigger which is approximately L-shaped as seen from the side (FIG. 2) and is swingable about a pivot pin 9 which projects laterally inside the hollow handle 7. The trigger 8 is connected to the carburetor or other fuel supply means (not shown) of the engine in such manner that the fuel supply, nd hence engine speed, is increased when the trigger 8 swung about its pivot 9 in a clockwise direction as iewed in FIG. 2. A spring 10 acts on the trigger 8 to ving it in a counter-clockwise direction to a position in hich only sufficient fuel is supplied to the engine for it run at idling speed.

In order to reduce the force required for cranking the ngine to start it, the engine cylinder 2 is provided with decompression port 12 which is located in the cylinder all at a selected distance from the head of the cylinder. he location of the decompression port is selected so as permit the escape of a portion of the fuel-air charge the cylinder during the compression stroke while proiding compression of the remaining portion of the charge fter the top of the piston passes the decompression port. y way of example, the decompression port is spaced om the head of the cylinder a distance equal to aproximately 15 to 25 percent of the stroke of the piston. his location has been found to reduce to an acceptable alue the force required for cranking the engine while ill retaining sufficient charge and compression for reliale firing of the engine.

The decompression port 12 is controlled by a valve 14 that the port is open to provide decompression during arting but is tightly closed at other times to prevent akage of gas from the cylinder when the engine is runing. The decompression control valve 14 is shown as omprising a valve housing 15 which is screwed or otherise secured in a boss 16 provided on the cylinder wall. t its inner end, the valve housing 15 is provided with an pening which is aligned with the decompression port 12 the cylinder wall and is surrounded by an annular alve seat 17. The valve seat is preferably of conical iape with an angle of inclination of, e.g., about 45° FIG. 4). The valve housing 15 is hollow with a cylinrical bore 18 which is aligned with the decompression ort 12 but of larger diameter. A discharge port 19 opens irough the side wall of the housing at a location just utwardly of the valve seat 17. The bore of the valve ousing receives a plunger 21 which is longitudinally slidble in the bore. A valve member 22, shown in the form of spherical ball, is received in the bore between the valve eat 17 and the inner end of the plunger 21. The ball 22 of hard corrosion resistant material, e.g., stainless steel, nd is of a diameter which is less than that of the bore 8 but greater than the minimum diameter of the valve eat so as to engage the seat as illustrated in FIG. 4. A ring 23 supported on a fixed stud 24 engages in a groove the outer end of the plunger 21 and acts to press the lunger inwardly against the ball 22 and thereby press ie ball into tight engagement with the valve seat 17 to lose the decompression port 12.

In accordance with the invention, unitary control means provided for holding the fuel member 8 in proper posion for starting and simultaneously holding the decomression valve 14 in open position. As illustrated by way f example in the drawings, the control means comprises ocking means for releasably locking the fuel control iember 8 in selected position and connections between ie locking means and the decompression valve 14 to old the valve open against the action of the spring 23 hen the locking means is in locked position. The locking ieans is shown in the form of a push-button 25 having head portion 26 and a stem portion 27 which is slidable a bushing 28 extending through a hole in one side all of the hollow hand grip portion 7. At its inner end, ie stem 27 is provided with a reduced portion terminatig in a head 29 of approximately the same cross sectionl dimensions as the stem. A coil spring 31 surrounding ie stem 27 acts between the side wall of the hand grip ortion 7 and the head 26 to bias the push-button to an uter position as shown in solid lines in FIG. 3.

The locking element 25 is so located and proportioned iat when the fuel control member 8 is moved to a posion to provide the desired amount of fuel for starting the engine and when the push-button 25 is pushed inwardly against the action of spring 31 to the position shown in dotted lines in FIG. 3, the head portion 29 at the inner end of the stem 27 engages a web portion 32 on the fuel control member 8 so as to hold the push-button in its inner position and thereby hold the fuel control member 8 in engine starting position.

The locking element 25 is suitably connected to the plunger 21 of the decompression valve 14 so as to hold the plunger out against the force of spring 23 and thereby hold the valve in open position when the locking element is in locked position as indicated by broken lines in FIG. 3. In the example illustrated in the drawings, the connection is by means of a lever 35 having an intermediate portion which is rotatably supported by a bracket 36 secured to a stationary portion of the engine, e.g., by screws 37. An arm 35a at one end of the lever 35 extends into a hole 38 provided in the plunger 21 near its outer end. An arm 35b at the other end of the lever 35 extends into an opening 29a in the head portion 26 of the locking elemtnt 25. The shape and location of the lever 35 are such that when the locking element 25 is pushed inwardly to its locked position as shown in broken lines in FIG. 3, the lever is rotated in the bearing provided by bracket 36 so as to swing the arm 35a in a counter-clockwise direction as seen in FIG. 3 and thereby move the plunger 21 outwardly against the bias of its spring 23. The valve member 22 is thereby released from its seat 17 to open the valve. The effective length of the lever arm 35b is greater than that of arm 35a to provide a mechanical advantage valve without requiring excessive pressure on the push button 25.

In preparation for starting the engine, the operator grasps the handle 7 and, with his middle finger, applies pressure to the trigger 8 to swing it about its pivot 9 in a clockwise direction as viewed in FIG. 2. With his forefinger, he then pushes the locking element 25 to its inner position and then releases the trigger 8 which, under pressure of the spring 10, returns toward idle position until the web portion 32 engages the reduced portion of the stem 27 of the locking element 25. Engagement of the head portion 29 on the inner end of stem 27 with the web portion 32 of the trigger 8 retains the locking element 25 in locked position and thereby holds the trigger 8 in position to supply the proper amount of fuel for starting. Movement of the locking element 25 to locked position has simultaneously opened the decompression valve 14 by reason of the connections provided by the lever 35. The engine is then ready for starting and is suitably cranked either by hand or by a starter. As soon as the engine starts, the operator applies pressure to the trigger 8 to regulate the speed of the engine as desired. The web portion 32 of the trigger 8 is thereby disengaged from the head 29 at the inner end of stem 27 of the locking element so that the locking element is moved by its spring 31 to its outer position as shown in solid lines in FIG. 3. By reason of the interconnection provided by lever 35, this movement of the locking element 25 releases the plunger 21 of the decompression valve 14 so that the plunger is moved inwardly by its spring 23 to press the ball 22 against the valve seat 17 and thereby close the decompression port 12.

When the decompression valve is held open by the lever 35 during starting of the engine, a portion of the fuel-air charge is released through the decompression port 12 and discharge port 19 during a portion of each compression stroke. The exhaust port 19 of the decompression valve 14 may, if desired, be connected to the crank case of the engine so as to return the discharge fuel-air charge to the crank case. Alternatively, the discharge port 19 may be connected to the exhaust system of the engine. However, in practice it has been found that the amount of fuel-air mixture discharged through the decompression port during starting of the engine is so small that it can be discharged directly to the atmosphere without any objectionable effects.

The ball 22 which constitutes the valve member of the decompression valve 14 is self-centering and is also free to rotate—when not being pressed by the plunger 21. Presumably by reason of such rotatability of the ball, the valve has been found to be self-cleaning so as to assure gas tight closure of the decompression port at all times when the valve 14 is closed. Objectionable leakage of gas from the cylinder is thereby avoided.

While it has been found in practice that gas pressure inside the cylinder is sufficient to unseat the ball 22 when the plunger 21 is withdrawn by the lever 35, means can be provided if desired for positively withdrawing the ball from its seat when the plunger 21 is moved outwardly. Such an arrangement is illustrated by way of example in FIG. 5 in which the plunger 21 is shown provided at its inner end with portions 40 which extend past the midpoint of the ball and are restricted so as to cage the ball while leaving it free to rotate and free to move laterally sufficiently to be self-centering.

Another form of the decompression valve is illustrated in FIG. 6. A valve plunger 41 corresponding to the plunger 21 illustrated in FIGS. 1 to 5 is divided into two portions namely, an outer portion 41a and an inner portion 41b which constitutes a valve member. The outer portion 41a is provided with an opening 42 to receive the arm 35a of the lever 35 and with a transverse groove to receive a spring 23. The inner portion 41b of the plunger is rotatable relative to the outer portion 41a. Hence, although the outer portion is held against rotation by the lever arm 35a and spring 23, the inner portion 41b is free to rotate. The two portions of plunger 41 are shown rotatably connected with one another by a reduced portion 43 on the inner end of the outer plunger portion 41a fitting sufficiently freely in a corresponding recess provided in the outer end of the inner plunger portion 41b to permit free rotation. The inner plunger portion 41b has a reduced portion 44 of smaller diameter than the inner diameter of the bore 18 of the valve housing. At its inner end, the inner plunger portion 41b has a frustoconical portion 45 adapted to seat on the valve seat 17 and a tip portion 46 adapted to project into the decompression port 12 to keep it clear of carbon or other deposits. It has been found that by reason of the rotatability of the inner plunger portion 41b constituting a valve member, the valve is self-adjusting and self-cleaning so as to maintain a fluid tight seal when the valve is in closed position.

While preferred embodiments of the invention have been illustrated by way of example in the drawings and have been herein particularly described, it will be understood that the invention is not thereby limited to the particular examples shown.

What we claim is:

1. Control means for an internal combustion engine having a cylinder and a hand grip, said control means comprising a decompression port in said cylinder, a normally closed compression relief valve closing said port, an engine fuel control member associated with said hand grip and operable to control the supply of fuel to said engine, locking means for releasably locking said fuel control member in selected position for starting said engine, said locking means being movable between a locking position and a released position and means connecting said locking means with said valve to hold said valve in open position when said locking means is in locking position.

2. Control means according to claim 1, in which said compression relief valve comprises a valve seat, a ball-shaped valve member adapted to seat on said seat and spring pressed means normally pressing said valve member on its seat.

3. Control means according to claim 2, in which said spring pressed means comprises a longitudinally slidable plunger and spring means pressing said plunger toward said valve member.

4. Control means according to claim 3, in which said valve member comprises a ball rotatably secured to an end of said plunger.

5. Control means according to claim 1, in which said locking means comprises a movable plunger and spring means urging said plunger toward released position, said plunger and fuel control member having cooperating latch means for holding said plunger in locking position, said latch means being releasable by movement of said fuel control member in a direction to increase engine speed.

6. Control means according to claim 1, in which said compression release valve comprises a valve seat, a rotatable valve member adapted to seat on said seat and spring pressed means normally pressing said valve member onto its seat.

7. Control means according to claim 1, in which said compression release valve comprises a valve seat, a valve housing having a bore aligned with said seat and a plunger longitudinally movable in said bore, said plunger comprising an outer non-rotating portion and an inner rotatable portion having a valve surface adapted to seat on said seat.

[8. Unitary control means for an internal combustion engine having a cylinder with a side wall and a head and a piston reciprocable in said cylinder, said control means comprising a manually operable starting control member which controls a starting function of the engine and is movable between a starting position for starting the engine and a running position when the engine has been started and is running, a decompression port located in the side wall of the cylinder and spaced from the head of the cylinder a distance equal to about 15% to 25% of the stroke of the piston, a normally closed compression relief valve for closing said port, and means connecting said starting control member with said valve to hold said valve in open position when said starting control member is in starting position.]

9. Control means according to claim [8] *11*, in which said compression relief valve comprises an annular valve seat surrounding said port, a rotatable self-centering valve member seating on said seat to close said port and movable outwardly from said seat to open said port and *in which said first biasing means comprises* spring means biasing said valve member to closed position.

10. Control means according to claim 9, in which said valve member has a portion adapted to project into said decompression port to keep it clear of engine deposits.

*11. In a hand held power tool comprising an internal combustion engine having a cylinder with a side wall and a head and a piston reciprocable in said cylinder, and provided with a hand grip, unitary control means comprising a decompression port located in the side wall of the cylinder and spaced from the head of the cylinder a distance equal to about 15% to 25% of the stroke of the piston, a movable compression relief valve for closing said port, first biasing means for biasing said valve to closed position, a manually operable fuel control member associated with said hand grip and operable to control the supply of fuel to the engine and thereby control engine speed, second biasing means for biasing said fuel control member to a position in which only sufficient fuel is supplied to the engine for it to run at idling speed, locking means for releasably holding said fuel control member in a selected position for starting said engine, said locking means being movable between a locking position in which said locking means hold said fuel control member in engine-starting position and a released position in which said fuel control member is released by said locking means, and means connecting said locking means with said compression relief valve to hold said valve in open position when said locking means is in locking position and to release said compression relief valve for positioning it*

*ı closed position by said first biasing means when said ›cking means is in released position.*

*12. Control means according to claim 11, in which said ɔnnecting means comprises lever means providing a me-ˈhanical advantage whereby the movement of said locking ıeans between released and locking position is greater ıan the movement of said valve between closed and open osition.*

*13. Control means according to claim 11, in which said ›cking means comprises a movable locking member and ›ring means biasing said locking member toward said ɛleased position, said locking member and said fuel con-ˈol member having interengaging portions for releasably ɛtaining said locking member in locking position when ıid fuel control member is in engine-starting position, ıid portions being disengaged by movement of said fuel ɔntrol member in a direction to increase engine speed to ɛlease said locking member for movement to released osition by said spring means.*

References Cited

The following references, cited by the Examiner, are of record in the patented file of this patent or the original patent.

UNITED STATES PATENTS

| | | | |
|---|---|---|---|
| 521,443 | 6/1894 | Shepperd | 123—182 |
| 2,440,483 | 4/1948 | Mennesson | 123—182 |
| 2,625,924 | 1/1953 | Friedlob | 123—182 |
| 2,742,380 | 4/1956 | Peters | 123—182 |
| 2,778,349 | 1/1957 | Thommen | 123—182 |
| 2,922,436 | 1/1960 | Brash | 123—182 X |
| 2,947,300 | 8/1960 | Trapp | 123—182 |

FOREIGN PATENTS

| | | | |
|---|---|---|---|
| 1,013,426 | 1/1958 | Germany | 123—182 |

WENDELL E. BURNS, Primary Examiner